US012703567B2

(12) United States Patent
Lee

(10) Patent No.: US 12,703,567 B2
(45) Date of Patent: Aug. 11, 2026

(54) APPARATUS AND METHOD FOR STORING ARTICLE

(71) Applicant: SEMES CO., LTD., Cheonan-si (KR)

(72) Inventor: Sungho Lee, Asan-si (KR)

(73) Assignee: SEMES CO., LTD., Cheonan-si (KR)

(*) Notice: Subject to any disclaimer, the term of this patent is extended or adjusted under 35 U.S.C. 154(b) by 512 days.

(21) Appl. No.: 18/135,128

(22) Filed: Apr. 15, 2023

(65) Prior Publication Data

US 2023/0382641 A1 Nov. 30, 2023

(30) Foreign Application Priority Data

May 26, 2022 (KR) ........................ 10-2022-0064857

(51) Int. Cl.
*B65G 1/04* (2006.01)

(52) U.S. Cl.
CPC ........ *B65G 1/04* (2013.01); *B65G 2201/0297* (2013.01)

(58) Field of Classification Search
CPC .......................... B65G 1/04; B65G 2201/0297
USPC .................................. 269/299, 310, 53, 54.5
See application file for complete search history.

(56) References Cited

U.S. PATENT DOCUMENTS 6,135,698 A * 10/2000 Bonora ............. H01L 21/67775 414/940
6,432,849 B1 * 8/2002 Endo ....................... H10P 72/14 206/710
11,107,717 B2 8/2021 Li et al.
12,198,956 B2 * 1/2025 Kuo .................. H01L 21/67379
2012/0298549 A1 * 11/2012 Fujimori ............. H10P 72/3406 206/719
2016/0001976 A1 1/2016 Nagamine
2018/0065777 A1 3/2018 Hirose et al.
2018/0082867 A1 * 3/2018 Balares ............... H10P 72/0442
2019/0206709 A1 * 7/2019 Li ..................... H01L 21/67769
2020/0075378 A1 * 3/2020 Chiu ................... H01L 21/6732
2022/0037178 A1 * 2/2022 Kuo .................. H01L 21/67769

FOREIGN PATENT DOCUMENTS

| | | |
|---|---|---|
| JP | 2003-142551 | 5/2003 |
| JP | 2014-126106 | 2/2017 |
| JP | 2018-040411 | 3/2018 |
| KR | 10-1252034 | 4/2013 |
| KR | 10-2018-0135062 | 12/2018 |
| KR | 10-2019-0063957 | 6/2019 |

OTHER PUBLICATIONS

Office Action of the Korean Intellectual Property Office dated Mar. 22, 2024.

* cited by examiner

*Primary Examiner* — Saul Rodriguez
*Assistant Examiner* — Brendan P Tighe

(57) ABSTRACT

The present invention relates to an apparatus and a method for storing an article, capable of storing at least two types of articles transferred in a semiconductor distribution line, in which the apparatus includes: an article storage rack including a space for storing a first article or a second article; and a variable alignment device installed on the article storage rack, in which at least one first alignment protrusion protrudes outward to align the first article when the first article is seated, and the first alignment protrusion is accommodated inward so that the first alignment protrusion does not interfere with the second article when the second article is seated.

15 Claims, 15 Drawing Sheets

APPARATUS AND METHOD FOR STORING ARTICLE

CROSS-REFERENCE TO RELATED PATENT APPLICATION

This application claims the benefit of Korean Patent Application No. 10-2022-0064857, filed on May 26, 2022, in the Korean Intellectual Property Office, the disclosure of which is incorporated herein in its entirety by reference.

BACKGROUND OF THE INVENTION

1. Field of the Invention

The present invention relates to an apparatus and a method for storing an article, and more particularly, to an apparatus and a method for storing an article, capable of storing at least two types of articles transferred in a semiconductor distribution line.

2. Description of the Related Art

In order to improve semiconductor manufacturing efficiency, in addition to a technology for improving various processes (e.g., exposure, deposition, etching, ion implantation, cleaning, etc.) performed by semiconductor manufacturing facilities, a facility for more effectively transferring at least two types of articles (e.g., a container or a front opening unified pod (FOUP) for storing a wafers, a reticle pod for storing a reticle, etc.) between semiconductor manufacturing facilities has been introduced and used. For example, an article transfer device including an overhead hoist transport (OHT) configured to transfer an article while moving along a transfer path provided on a ceiling of a semiconductor manufacturing factory has been widely used.

The article transfer device including the overhead hoist transport (hereinafter referred to as "OHT") may include: a travel rail for providing a transfer path; a vehicle for traveling along the travel rail; and a hoist device provided under the vehicle. The hoist device may support a transfer target article, and a hoist may rotate the article, move the article in a horizontal direction, or lift and lower the article in a vertical direction so that the article may be seated on an article storage rack.

A buffer may be a single or multiple article storage racks for providing a temporary storage space for an article, and may be a side track buffer (STB) installed on a lateral side of the transfer path or an under track buffer (UTB) installed on a lower side of the transfer path.

A conventional buffer may be configured separately for each type of container. For example, a buffer for a reticle pod for storing a reticle may be separately configured, and a buffer for a front opening unified pod (FOUP) for storing a wafer may be separately configured.

SUMMARY OF THE INVENTION

However, since buffers configured separately for each container have to be configured as buffers having mutually different specifications depending on the type of container, an installation volume or a number of installations of the buffer may be increased. For example, since a buffer for storing a reticle pod and a buffer for storing a front opening unified pod are separately provided, space utilization may be greatly reduced, and since a transfer path is long or complicated, an equipment operation may be very inconvenient and difficult depending on the type of container.

To solve various problems, including the problems described above, an object of the present invention is to provide an apparatus and a method for storing an article, capable of storing at least two types of articles transferred in a semiconductor distribution line. However, since the above object has been provided for illustrative purposes, the scope of the present invention is not limited thereby.

To achieve the object described above, according to the idea of the present invention, there is provided an apparatus for storing an article, the apparatus including: an article storage rack including a space for storing a first article or a second article; and a variable alignment device installed on the article storage rack, in which at least one first alignment protrusion protrudes outward to align the first article when the first article is seated, and the first alignment protrusion is accommodated inward so that the first alignment protrusion does not interfere with the second article when the second article is seated.

In addition, according to the present invention, the variable alignment device may include: a base plate formed on a top surface thereof with at least one second alignment protrusion to align the second article, and including a reception part; a movable plate installed in the reception part so as to be freely lifted and lowered, and formed thereon with the at least one first alignment protrusion; and at least one elastic spring having a restoring force acting in a direction in which the movable plate is lifted.

In addition, according to the present invention, three second alignment protrusions, which are triangularly arranged to correspond to three alignment grooves formed in a bottom surface of the second article, may be formed on the top surface of the base plate at a periphery of the reception part.

In addition, according to the present invention, the movable plate may include: a movable plate body substantially having a flat plate shape; three first alignment protrusions formed on a top surface of the movable plate body, and triangularly arranged to correspond to three alignment grooves formed in a bottom surface of the first article; and a stopper formed on one side surface of the movable plate body, and protruding in a lateral direction to prevent the movable plate body from being separated from the reception part.

In addition, according to the present invention, the movable plate may further include: a guide formed on the top surface of the movable plate body, and having a second height that is higher than a first height of the first alignment protrusion to protect the first alignment protrusion.

In addition, according to the present invention, the guide may be each of four protruding bent pieces installed on front, rear, left, and right sides of the movable plate body, respectively, protruding laterally from the movable plate body, and bent upward.

In addition, according to the present invention, at least one of the first alignment protrusions may be installed adjacent to at least one of stoppers so as to be dynamically balanced, and the second alignment protrusion may be disposed between at least one of the stoppers and at least one of the guides.

In addition, according to the present invention, the base plate may include at least one guide corresponding part formed in the reception part to correspond to the guide.

In addition, according to the present invention, the elastic spring may be configured such that a sum of restoring forces is greater than a first weight of the first article and less than a second weight of the second article.

In addition, according to the present invention, the variable alignment device may further include: a fixing plate installed to the base plate while being spaced apart from the base plate by a clearance distance so as to support the elastic spring and allow the movable plate to be lifted and lowered in a separation space.

In addition, according to the present invention, the first article may include a reticle pod for storing a reticle, and the second article may include a front opening unified pod (FOUP) for storing a plurality of wafers.

In addition, according to the present invention, the second article may have a second weight that is greater than a first weight of the first article.

In addition, according to the present invention, the article storage rack may include an under track buffer (UTB) or a side track buffer (STB).

In addition, according to the present invention, the article storage rack may include: a frame installed on at least one of a ceiling, a wall, and a floor; and at least one shelf support installed on the frame to support the first article or the second article.

In addition, according to the present invention, the variable alignment device may include: a cylinder part formed on the article storage rack, in which the first alignment protrusion including a stopper is formed on one side of the cylinder part so as to be lifted and lowered; and an elastic member installed in the cylinder part, and having a restoring force formed in a direction in which the first alignment protrusion protrudes.

In addition, according to the present invention, the apparatus for storing the article may further include: an operation detection device for detecting an operation state of the variable alignment device, and applying a detection signal to a control unit.

Meanwhile, to achieve the object described above, according to the idea of the present invention, there is provided a method for storing an article, the method including: (a) seating a first article in a space of an article storage rack by an article transfer device; (b) maintaining a state in which at least one first alignment protrusion protrudes outward to align the first article by using a variable alignment device installed in the article storage rack; (c) transferring the first article to another place, and seating a second article in the space of the article storage rack by the article transfer device; and (d) aligning the second article to at least one second alignment protrusion by using the variable alignment device installed in the article storage rack, and accommodating the first alignment protrusion inward so that the first alignment protrusion does not interfere with the second article.

In addition, according to the present invention, the method for storing the article may further include: (e) allowing the at least one first alignment protrusion to protrude outward by the variable alignment device when the second article is transferred to another place.

In addition, according to the present invention, in the step (b), at least one elastic spring having a restoring force that is greater than a weight of the first article may be used to maintain the state in which the first alignment protrusion protrudes outward, and, in the step (d), the elastic spring having a restoring force that is less than a weight of the second article may be used to accommodate the first alignment protrusion inward so that the first alignment protrusion does not interfere with the second article.

Meanwhile, to achieve the object described above, according to the idea of the present invention, there is provided an apparatus for storing an article, the apparatus including: an article storage rack including a space for storing a first article or a second article; and a variable alignment device installed on the article storage rack, in which at least one first alignment protrusion protrudes outward to align the first article when the first article is seated, and the first alignment protrusion is accommodated inward so that the first alignment protrusion does not interfere with the second article when the second article is seated, wherein the variable alignment device includes: a base plate formed on a top surface thereof with at least one second alignment protrusion to align the second article, and including a reception part; a movable plate installed in the reception part so as to be freely lifted and lowered, and formed thereon with the at least one first alignment protrusion; at least one elastic spring having a restoring force acting in a direction in which the movable plate is lifted; and a fixing plate installed to the base plate while being spaced apart from the base plate by a clearance distance so as to support the elastic spring and allow the movable plate to be lifted and lowered in a separation space, and the movable plate includes: a movable plate body substantially having a flat plate shape; three first alignment protrusions formed on a top surface of the movable plate body, and triangularly arranged to correspond to three alignment grooves famed in a bottom surface of the first article; a stopper formed on one side surface of the movable plate body, and protruding in a lateral direction to prevent the movable plate body from being separated from the reception part; and a guide formed on the top surface of the movable plate body, and having a second height that is higher than a first height of the first alignment protrusion to protect the first alignment protrusion.

According to various embodiments of the present invention configured as described above, at least two types of articles transferred in a semiconductor distribution line may be stored in a manner that an installation volume or a number of installations of a buffer can be significantly reduced, one buffer may store both a reticle pod and a front opening unified pod so that space utilization can be maximized, and a transfer path may be reduced and simplified so that an equipment operation can be facilitated. However, the scope of the present invention is not limited by the above effect.

DETAILED DESCRIPTION OF THE INVENTION

Figure 1:
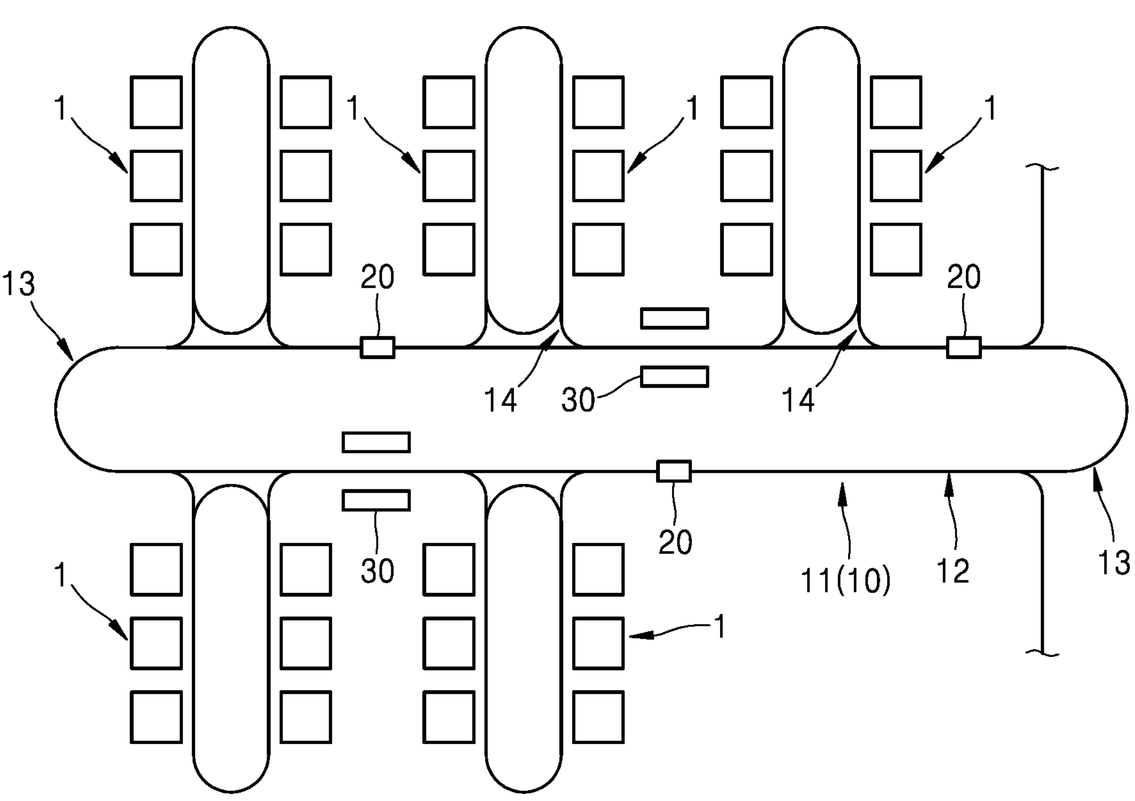
FIG. 1 is a conceptual diagram showing an overall configuration of an apparatus for storing an article according to some embodiments of the present invention.

Hereinafter, various exemplary embodiments of the present invention will be described in detail with reference to the accompanying drawings.

Embodiments of the present invention are provided to more completely describe the present invention to a person having ordinary skill in the art, the following embodiment may be modified in various other forms, and the scope of the present invention is not limited to the following embodiment. Rather, the embodiments are provided so that the present disclosure will be thorough and complete, and will fully convey the idea of the present invention to those skilled in the art. In addition, in the drawings, a thickness or a size of each layer is exaggerated for convenience and clarity of description.

Terms used herein are intended to describe specific embodiments, and shall by no means restrict the present invention. As used herein, unless the context explicitly indicates otherwise, an expression in a singular form may include a meaning of a plural form. In addition, as used herein, a term "comprise" and/or "comprising" is intended to specify the presence of shapes, numbers, steps, operations, members, elements, and/or groups thereof that are described, and shall not be construed to preclude the presence or addition of one or more other shapes, numbers, operations, members, elements, and/or groups thereof.

Hereinafter, the embodiments of the present invention will be described with reference to the drawings schematically showing ideal embodiments of the present invention. In the drawings, modifications of a depicted shape may be expected depending on, for example, a manufacturing technique and/or a tolerance. Therefore, an embodiment of the present inventive concept shall not be construed as being limited to a specific shape of a depicted region in the present disclosure, but shall include, for example, a change in a shape caused by a manufacturing factor.

Meanwhile, in the drawings, a size or a shape of an element, a thickness of a line, and the like may be somewhat exaggerated for convenience of understanding.

The present invention may be mainly used to transfer an article from an arbitrary position to a desired position in a factory for manufacturing a semiconductor or a flat panel displays (FPD). For example, the present invention may transfer an article between semiconductor (or flat panel display) manufacturing facilities. In this case, the article may include a substrate (a wafer, etc.). For example, the article may be a container in which substrates are accommodated. Furthermore, the container may be a sealed container capable of protecting the accommodated substrates from an outside. In addition, the sealed container may include a reticle pod for storing a reticle or a front opening unified pod (FOUP).

A semiconductor manufacturing factory may include at least one clean room, and semiconductor manufacturing facilities for performing semiconductor manufacturing processes may be installed in the clean room. A semiconductor may be finished by repeatedly performing semiconductor manufacturing processes on a wafer. A wafer that has been subjected to a process performed in a specific semiconductor manufacturing facility may be transferred to a semiconductor manufacturing facility for a next process. In this case, a reticle, which is a kind of optical mask, may be transferred by an article transfer device including an overhead hoist transport (OHT) while being accommodated in a reticle pod RP, and a wafer may be transferred by an article transfer facility including an OHT while being accommodated in a front opening unified pod (FOUP).

FIG. 1 is a conceptual diagram showing an overall configuration of an apparatus for storing an article according to some embodiments of the present invention.

As shown in FIG. 1 that shows an overall configuration of an apparatus for storing an article including a buffer 30 and the like according to some embodiments of the present invention, an apparatus for storing the article such as the buffer 30 according to some embodiments of the present invention may be a place in which an article transfer device 20 for traveling along a travel rail that provides a transfer path 11 for transferring an article between semiconductor manufacturing facilities 1 stores the article, in which the buffer 30 may be a single article storage rack or a plurality of article storage racks for providing a temporary storage space for an article. The travel rail 10 may be disposed on a ceiling of a semiconductor manufacturing factory. Article transfer devices 20 may directly transfer the article from a specific facility to another facility among the semiconductor manufacturing facilities 1, or may temporarily store the article in the apparatus for storing the article such as the buffer 30 and transfer the temporarily stored article to another facility.

The buffer 30 may be a side track buffer (STB) installed on a lateral side of the transfer path 11 or an under track buffer (UTB) installed on a lower side of the transfer path 11.

The article transfer device 20 may include an overhead hoist transport (OHT), and may include a travel rail 10, a plurality of article transfer vehicles, and the like. According to an embodiment of the present invention, the article transfer device 20 may be configured to operate by receiving a driving power from a power supply device through a power supply unit and a power reception unit, and may further include an integrated control device, also referred to as an OHT control system (OCS), so as to be operated automatically.

As shown in FIG. 1, the transfer path 11 may include: at least one straight line section 12 having a straight line shape; at least one curved line section 13 having a curved line shape; and at least one connection section 14 for allowing a path to diverge and/or converge.

Figure 2:
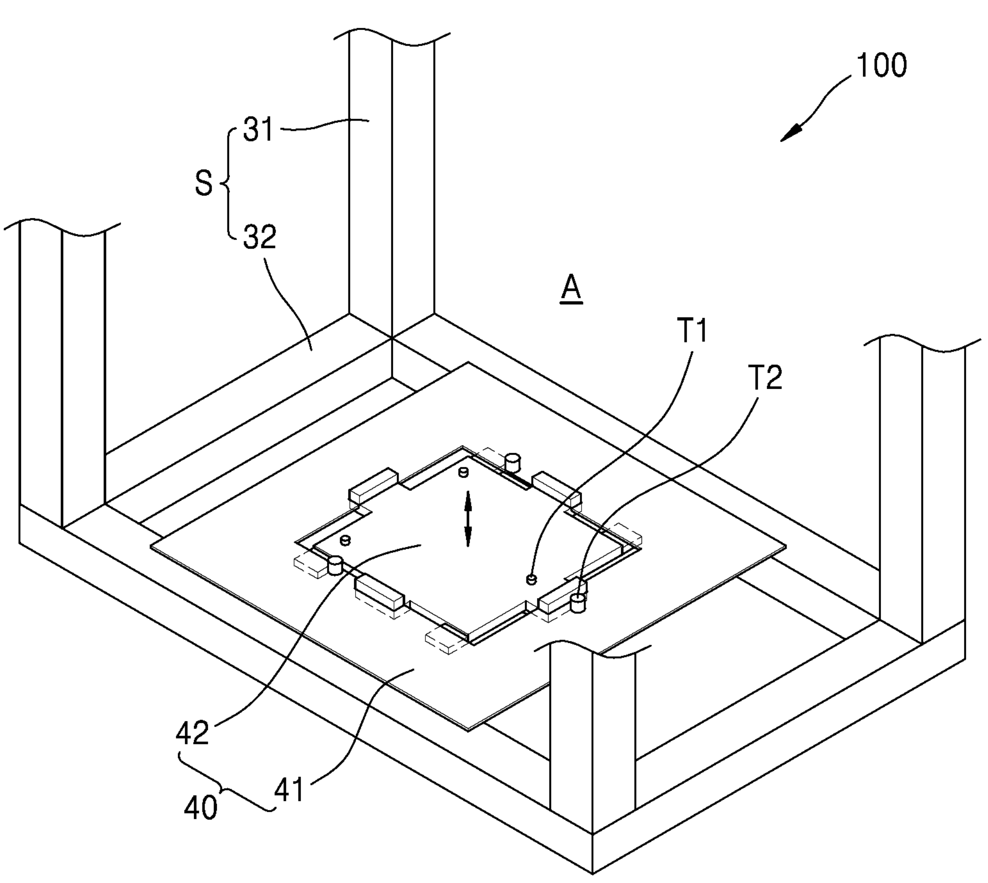
FIG. 2 is a perspective view showing the apparatus for storing the article of FIG. 1.
Figure 3:
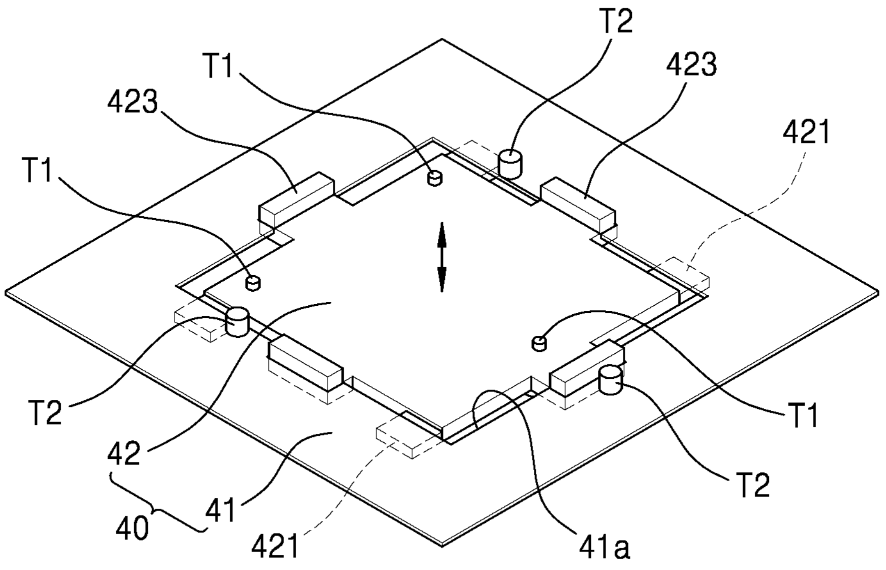
FIG. 3 is an enlarged perspective view showing the apparatus for storing the article of FIG. 2.
Figure 4:
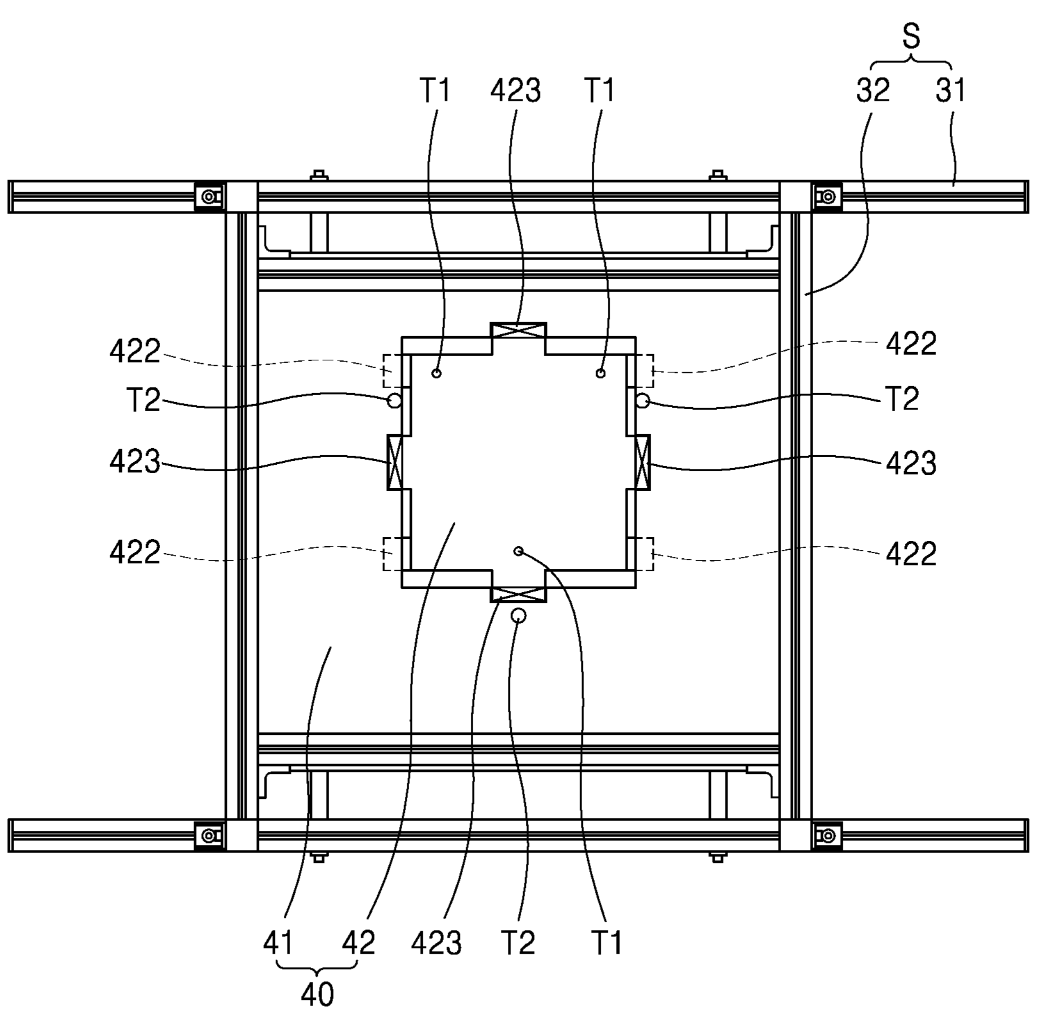
FIG. 4 is a plan view showing a state in which the apparatus for storing the article of FIG. 3 is installed.
Figure 5:
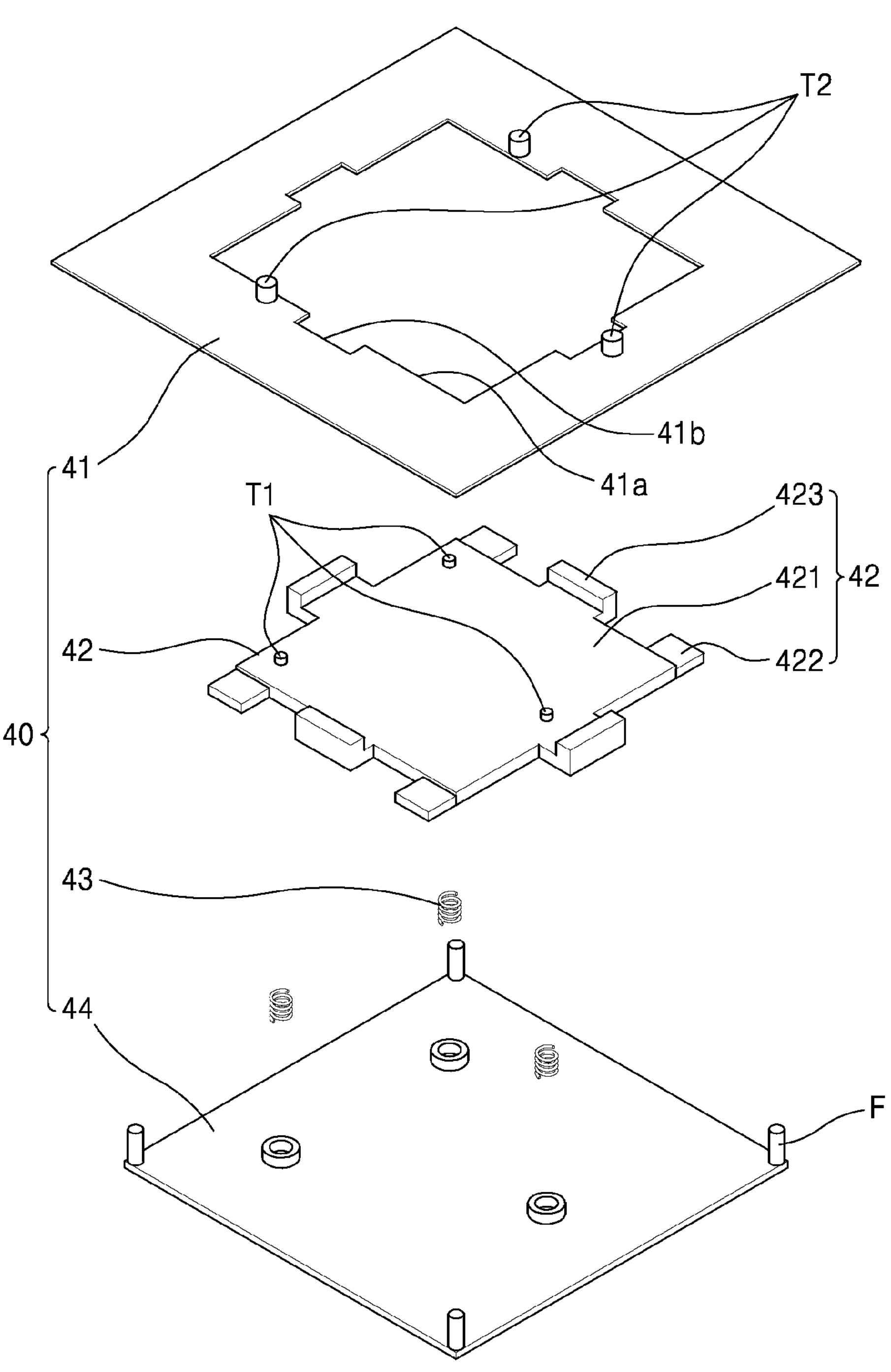
FIG. 5 is an exploded perspective view showing a variable alignment device of the apparatus for storing the article of FIG. 3.

FIG. 2 is a perspective view showing the apparatus 100 for storing the article of FIG. 1, FIG. 3 is an enlarged perspective view showing the apparatus 100 for storing the article of FIG. 2, FIG. 4 is a plan view showing a state in which the apparatus 100 for storing the article of FIG. 3 is installed, and FIG. 5 is an exploded perspective view showing a variable alignment device 40 of the apparatus 100 for storing the article of FIG. 3.

As shown in FIGS. 1 to 5, according to some embodiments of the present invention, an apparatus 100 for storing an article may be a kind of article storage place including the buffer 30 of FIG. 1, and may broadly include an article storage rack S and a variable alignment device 40.

The article storage rack S may be a storage structure including a space A for storing a first article M1 or a second article M2. For example, the article storage rack S may include: a frame 31 installed on at least one of a ceiling, a wall, and a floor of a semiconductor manufacturing factory; and at least one shelf support 32 installed on the frame 31 to support the first article M1 or the second article M2.

In this case, the frame 31 may be a structure having sufficient strength and durability to support the first article M1 or the second article M2 and support various auxiliary facilities such as a purge line for supplying a purge gas into the variable alignment device 40 or other articles M1 and M2. For example, the frame 31 may be formed by assembling or welding a vertical member, a horizontal member, a panel member, or the like.

The frame 31 is not necessarily limited to the drawing, and the frame 31 may have various shapes depending on specifications of a semiconductor manufacturing factory, a work space, a work type, or the like.

The article storage rack S may include an under track buffer (UTB) installed on the lower side of the transfer path 11 or a side track buffer (STB) installed on the lateral side of the transfer path 11 depending on an installation position or a transfer scheme.

However, various buffers other than the buffer 30 described above may be applied to the article storage rack S. In addition, all kinds of stages, ports, or the like of semiconductor equipment or a semiconductor facility may be included without being necessarily limited to the buffer.

The variable alignment device 40 may be a kind of a seating device including a variable protrusion, which is installed on the article storage rack S, in which at least one first alignment protrusion T1 protrudes outward to align the first article M1 when the first article M1 is seated, and the first alignment protrusion T1 is accommodated inward so that the first alignment protrusion T1 does not interfere with the second article M2 when the second article M2 is seated.

For example, the first article M1 may be a reticle pod RP for storing a reticle R, and the second article M2 may be a front opening unified pod FOUP for storing a plurality of wafers W.

Figure 6:
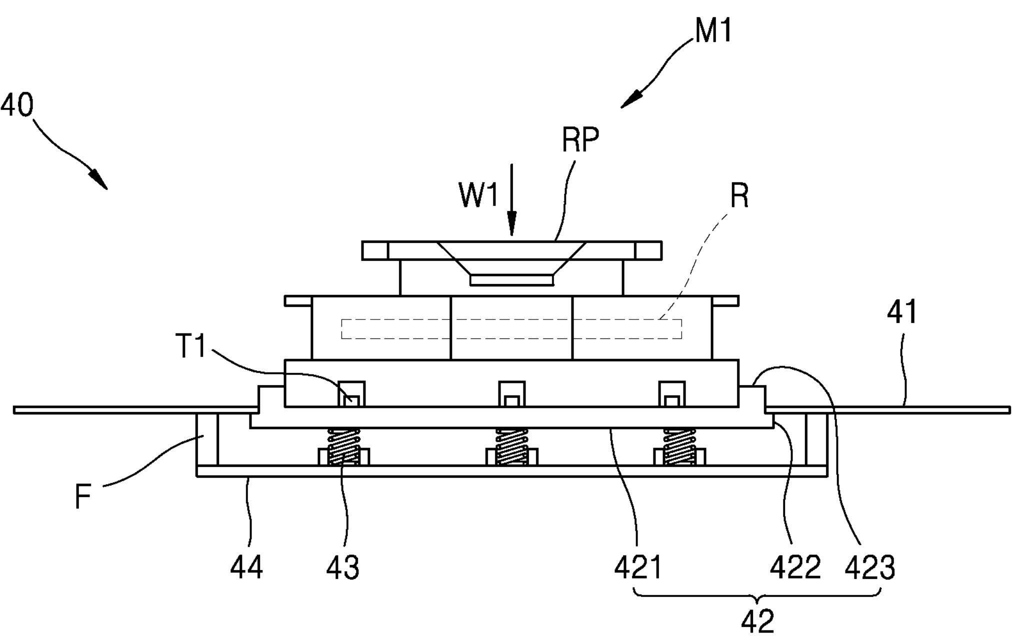
FIG. 6 is a sectional side view showing a state in which a reticle pod is seated on the variable alignment device of the apparatus for storing the article of FIG. 2.
Figure 9:
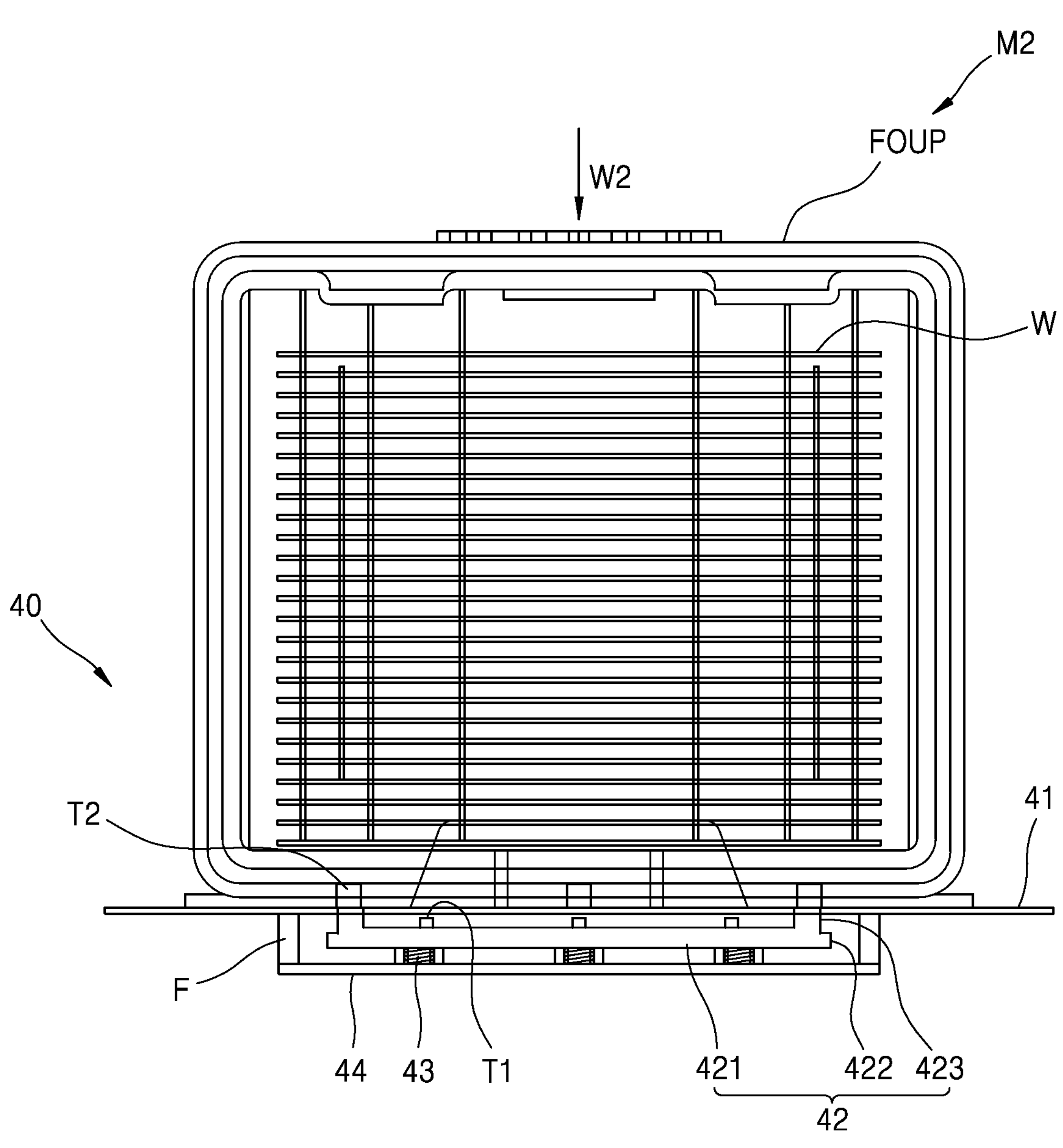
FIG. 9 is a sectional side view showing a state in which a front opening unified pod is seated on the variable alignment device of the apparatus for storing the article of FIG. 2.

The second article M2 may have a second weight W2 of FIG. 9, which is greater than a first weight W1 of FIG. 6 of the first article M1.

In general, the reticle pod RP of FIG. 6 may receive one reticle R so that an overall weight may be about 1 kg to 3 kg, and the front opening unified pod FOUP of FIG. 9 may receive the wafers W so that an overall weight may be about 5 kg to 9 kg.

The variable alignment device 40 may include: a base plate 41 formed on a top surface thereof with at least one second alignment protrusion T2 to align the second article M2, and including a reception part 41*a*; a movable plate 42 installed in the reception part 41*a* so as to be freely lifted and lowered, and formed thereon with the at least one first alignment protrusion T1; at least one elastic spring 43 having a restoring force acting in a direction in which the movable plate 42 is lifted; and a fixing plate 44 installed to the base plate 41 by a fixing member F while being spaced apart from the base plate 41 by a clearance distance so as to support the elastic spring 43 and allow the movable plate 42 to be lifted and lowered in a separation space.

The base plate 41 may be a kind of a structure in a form of a fixed plate, in which three second alignment protrusions T2, which are triangularly arranged to correspond to three alignment grooves formed in a bottom of the second article M2, are formed on the top surface of the base plate 41 at a periphery of the reception part 41*a*.

Although not shown, various devices such as a purge gas input port for supplying a purge gas into the front opening unified pod FOUP, a purge gas discharge port for discharging the purge gas, or a seating detection sensor may be additionally disposed on the top surface of the base plate 41.

Figure 10:
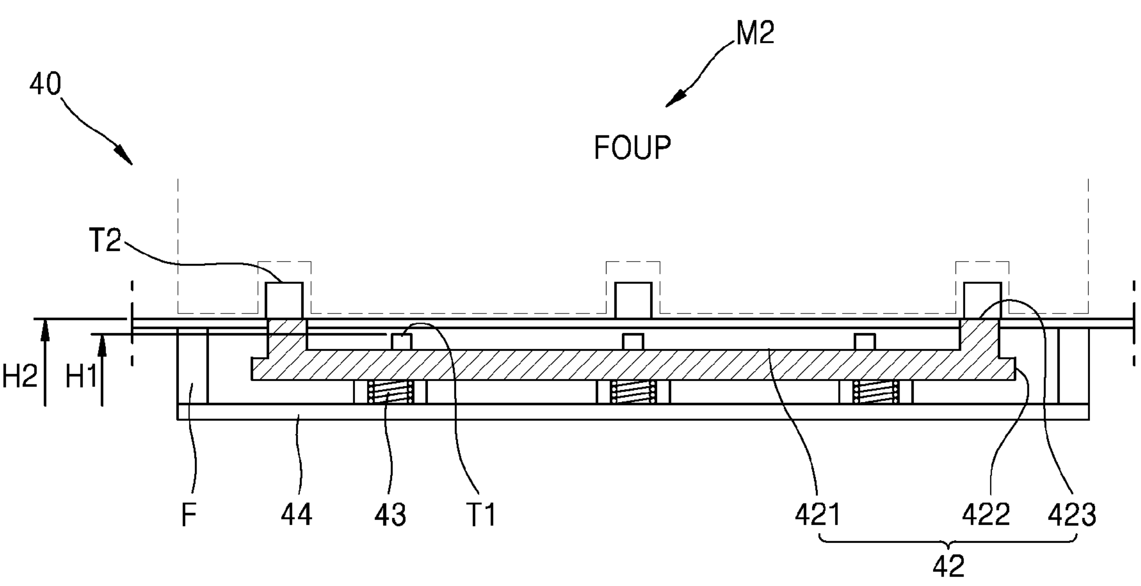
FIG. 10 is an enlarged sectional side view showing a state in which the front opening unified pod is seated on the variable alignment device of the apparatus for storing the article of FIG. 9.

The movable plate 42 may be a structure in a form of a movable plate that is lifted and lowered based on the base plate 41, and the movable plate 42 may include: a movable plate body 421 substantially having a flat plate shape; three first alignment protrusions T1 formed on a top surface of the movable plate body 421, and triangularly arranged to correspond to three alignment grooves formed in a bottom surface of the first article M1; a stopper 422 famed on one side surface of the movable plate body 421, and protruding in a lateral direction to prevent the movable plate body 421 from being separated from the reception part 41*a*; and a guide 423 formed on the top surface of the movable plate body 421, and having a second height H2 that is higher than a first height H1 of the first alignment protrusion T1 of FIG. 10 to protect the first alignment protrusion T1 from the second article M2 by making contact with the second article M2 first.

The guide 423 may be each of four protruding bent pieces installed on front, rear, left, and right sides of the movable plate body 421, respectively, protruding laterally from the movable plate body 421, and bent upward.

In this case, the base plate 41 may include at least one guide corresponding part 41*b* formed in the reception part 41*a* to correspond to the guide 423, so that a lifting and lowering motion of the guide 423 may be stably guided.

The elastic spring 43 may be configured such that a sum of restoring forces is greater than a first weight W1 of the first article M1 and less than a second weight W2 of the second article M2.

Therefore, due to elastic springs 43, when the first article M1 is seated on the movable plate 42, the movable plate 42 may not be lowered, and a state in which the first alignment protrusion T1 protrudes outward may be maintained. Meanwhile, when the second article M2 is seated on the movable plate 42, the movable plate 42 may be lowered by the second weight W2 that is greater than the first weight W1 so that the first alignment protrusion T1 may be accommodated inward of the base plate 41.

As shown in FIG. 4, at least one of the first alignment protrusions T1 may be installed adjacent to at least one of stoppers 422 so as to be dynamically balanced, and the second alignment protrusion T2 may be disposed between at least one of the stoppers 422 and at least one of the guides 423.

Therefore, three points in which an external force is generated, that is, the first alignment protrusion T1, the stopper 422, and the second alignment protrusion T2 may congregate so as to be adjacent to each other, and may be triangularly arranged at edge portions of the variable alignment device 40, so that an arrangement structure that is dynamically strong against an external force may be formed to have high weight resistance and high durability.

Figure 7:
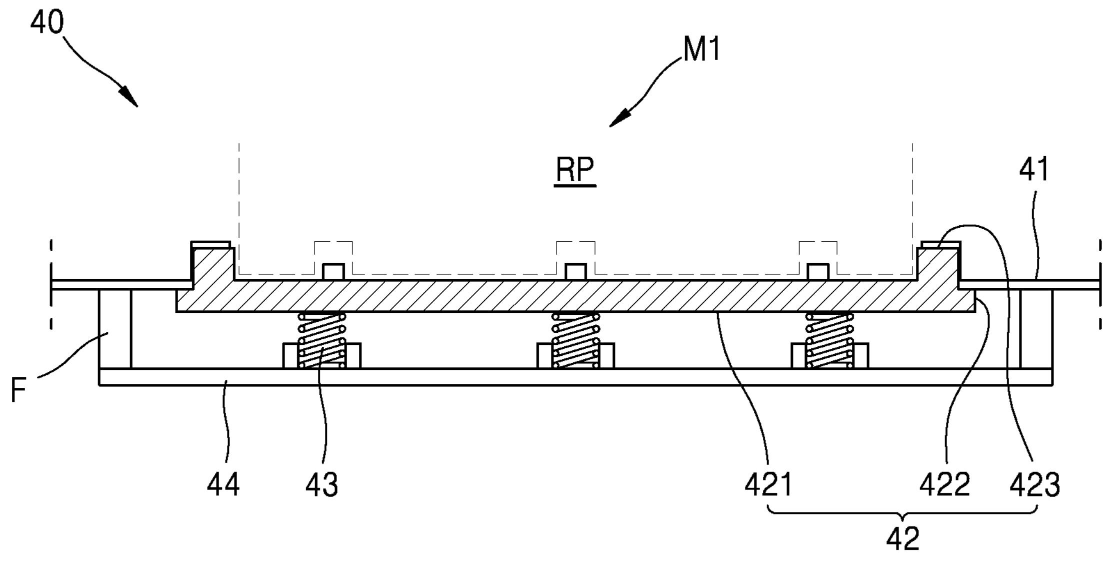
FIG. 7 is an enlarged sectional side view showing a state in which the reticle pod is seated on the variable alignment device of the apparatus for storing the article of FIG. 6.
Figure 8:
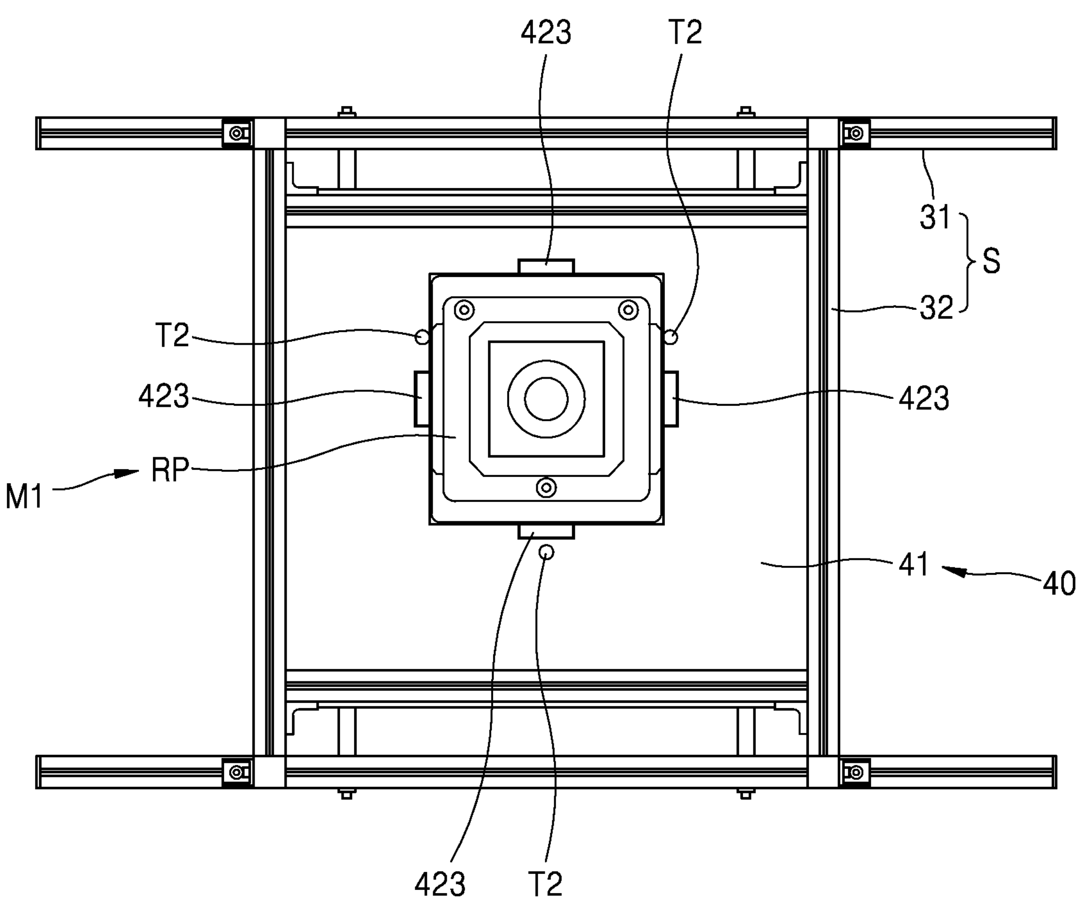
FIG. 8 is a plan view showing the state in which the reticle pod is seated on the variable alignment device of the apparatus for storing the article of FIG. 6.

FIG. 6 is a sectional side view showing a state in which a reticle pod RP is seated on the variable alignment device 40 of the apparatus 100 for storing the article of FIG. 2, FIG. 7 is an enlarged sectional side view showing a state in which the reticle pod RP is seated on the variable alignment device 40 of the apparatus 100 for storing the article of FIG. 6, and FIG. 8 is a plan view showing the state in which the reticle pod RP is seated on the variable alignment device 40 of the apparatus 100 for storing the article of FIG. 6.

As shown in FIGS. 6 to 8, a storage process of the apparatus 100 for storing the article according to some embodiments of the present invention when the first article M1, that is, the reticle pod RP is seated will be described. First, when the first article M1 is seated in the space A of the article storage rack S by the article transfer device 20 such as an OHT, a state in which at least one first alignment protrusion T1 protrudes outward to align the first article M1 by using the variable alignment device 40 installed in the article storage rack S may be maintained.

In this case, since the sum of the restoring forces of the elastic spring 43 is greater than the first weight W1 of the first article M1 described above, even when the first article M1 is seated on the movable plate 42 by the elastic springs 43, the movable plate 42 may not be lowered, and the state in which the first alignment protrusion T1 protrudes outward may be maintained.

In this case, the first article M1 may have a small width or may be pre-designed so as not to interfere with the second alignment protrusion T2. Since a general reticle pod RP has a smaller width than the front opening unified pod FOUP, the reticle pod RP may not interfere with the second alignment protrusion T2.

Figure 11:
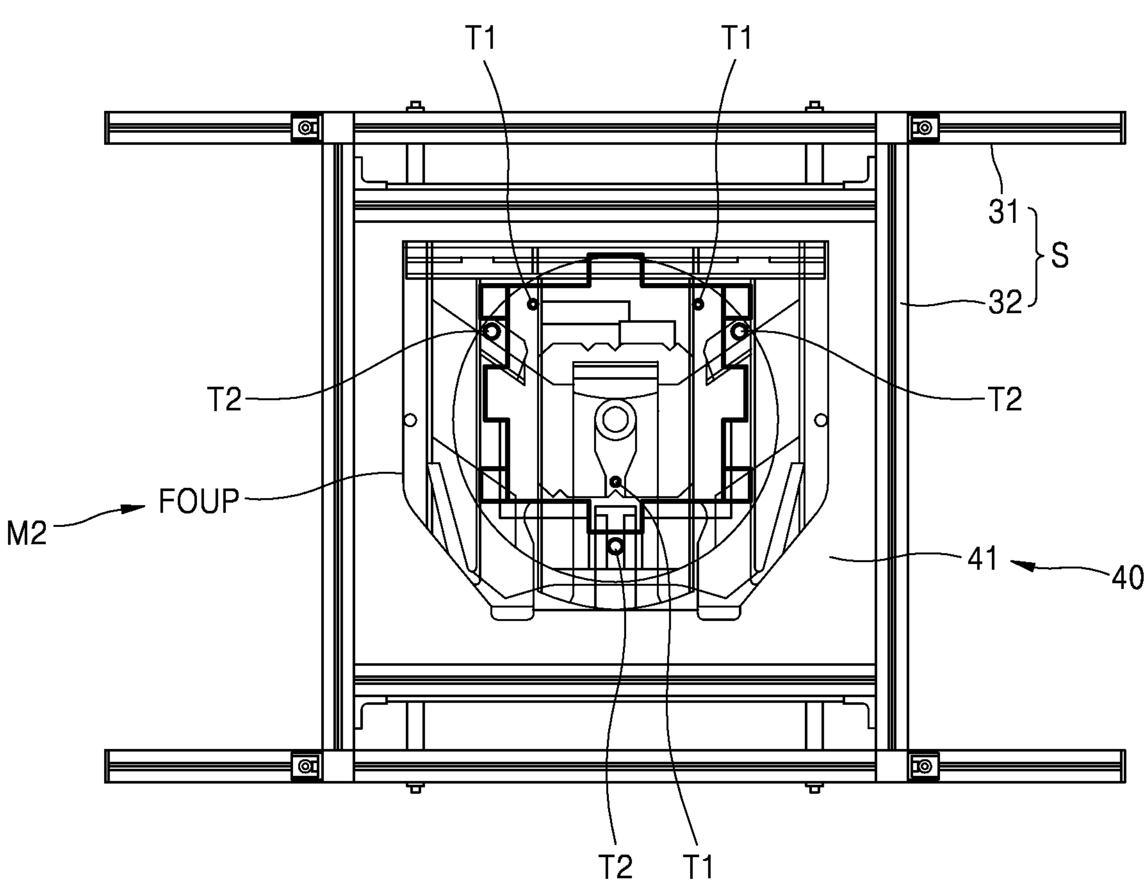
FIG. 11 is a plan view showing the state in which the front opening unified pod is seated on the variable alignment device of the apparatus for storing the article of FIG. 9.

FIG. 9 is a sectional side view showing a state in which a front opening unified pod FOUP is seated on the variable alignment device of the apparatus 100 for storing the article of FIG. 2, FIG. 10 is an enlarged sectional side view showing a state in which the front opening unified pod FOUP is seated on the variable alignment device of the apparatus 100 for storing the article of FIG. 9, and FIG. 11 is a plan view showing the state in which the front opening unified pod FOUP is seated on the variable alignment device 40 of the apparatus 100 for storing the article of FIG. 9.

As shown in FIGS. 9 to 11, a storage process of the apparatus 100 for storing the article according to some embodiments of the present invention when the second article M2, that is, the front opening unified pod FOUP is seated will be described. First, when the second article M2 is seated in the space A of the article storage rack S by the article transfer device 20 such as OHT, the second article M2 may be aligned to at least one second alignment protrusion T2 by the variable alignment device 40 installed in the article storage rack S, and the first alignment protrusion T1 may be accommodated inward so that the first alignment protrusion T1 may not interfere with the second article M2.

In this case, since the sum of the restoring forces of the elastic spring 43 is less than the second weight W2 of the second article M2 described above, when the second article M2 is seated on the movable plate 42 by the elastic springs 43, the movable plate 42 may be lowered so that the first alignment protrusion T1 may be accommodated inward.

In this case, the second article M2 may have a wide width or may be pre-designed to allow the first alignment protrusion T1 to be lowered. Since a general front opening unified pod FOUP has a wider width than the reticle pod RP, the front opening unified pod FOUP may press and lower the first alignment protrusion T1.

In this case, as shown in FIG. 10, the guide 423 having the second height H2 that is higher than the first height H1 of the first alignment protrusion T1 may collide with and make contact with the front opening unified pod FOUP so as to protect the first alignment protrusion T1 from an external force when the first alignment protrusion T1 is accommodated inward.

Thereafter, although not shown, when the second article M2 is transferred to another place, the at least one first alignment protrusion T1 may protrude outward again by the variable alignment device 40 so as to stand by.

Therefore, at least two types of articles transferred in a semiconductor distribution line may be stored in a manner that an installation volume or a number of installations of the buffer 30 may be significantly reduced, one buffer 30 may store both the reticle pod RP and the front opening unified pod FOUP so that space utilization may be maximized, and the transfer path may be reduced and simplified so that an equipment operation may be facilitated.

Figure 12:
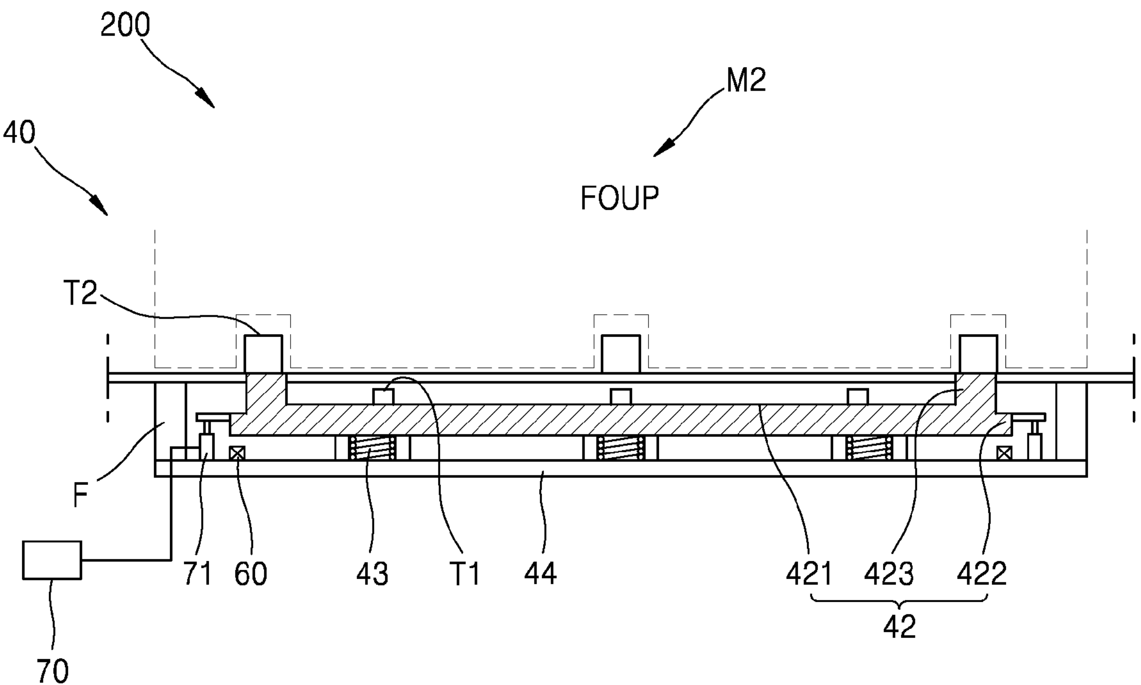
FIG. 12 is an enlarged sectional side view showing a state in which a front opening unified pod is seated on a variable alignment device of an apparatus for storing an article according to some other embodiments of the present invention.

FIG. 12 is an enlarged sectional side view showing a state in which a front opening unified pod FOUP is seated on a variable alignment device 40 of an apparatus 200 for storing an article according to some other embodiments of the present invention.

As shown in FIG. 12, an apparatus 200 for storing an article according to some other embodiments of the present invention may further include an operation detection device 60 for detecting an operation state of the variable alignment device 40 and applying a detection signal a control unit 70, or applying a detection signal so that the control unit 70 may operate a variable actuator 71 of the variable alignment device 40.

Therefore, as shown in FIG. 12, the movable plate 42 may be lowered by itself by using the variable actuator 71 such as a motor, a linear motor, or a cylinder without colliding with or making contact with the second article M2 when the second article M2 is stored.

In this case, the operation detection device 60 may detect the operation state of the movable plate 42 to apply an operation signal, or may apply an article determination signal for determining whether a type of an article that is stored is the first article or the second article.

Figure 13:
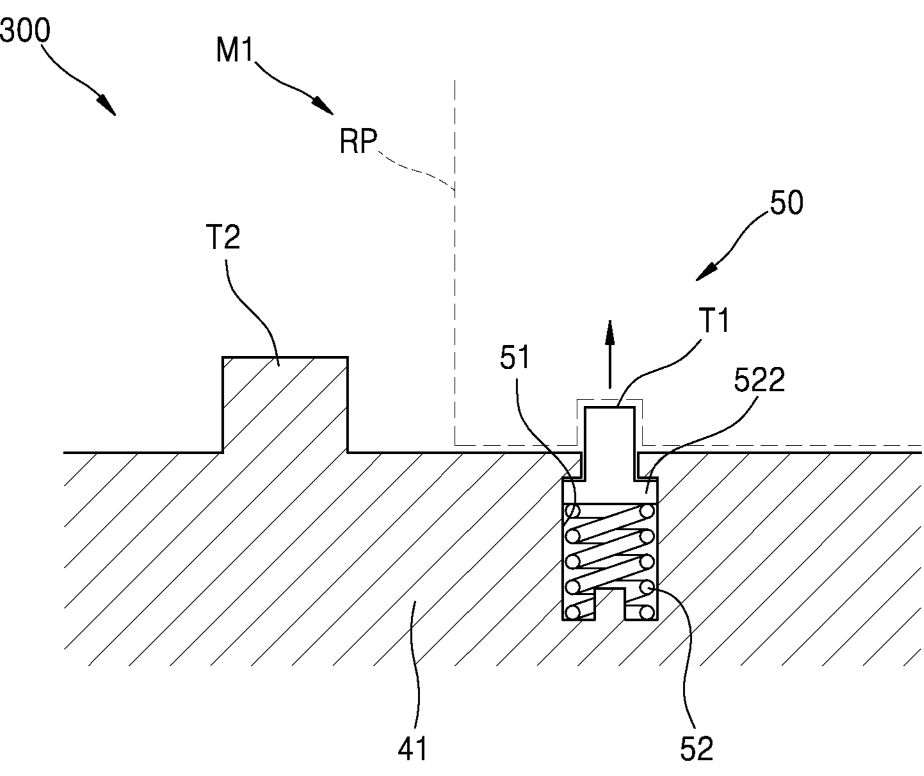
FIG. 13 is an enlarged sectional side view showing a state in which a reticle pod is seated on a variable alignment device of an apparatus for storing an article according to some still other embodiments of the present invention.
Figure 14:
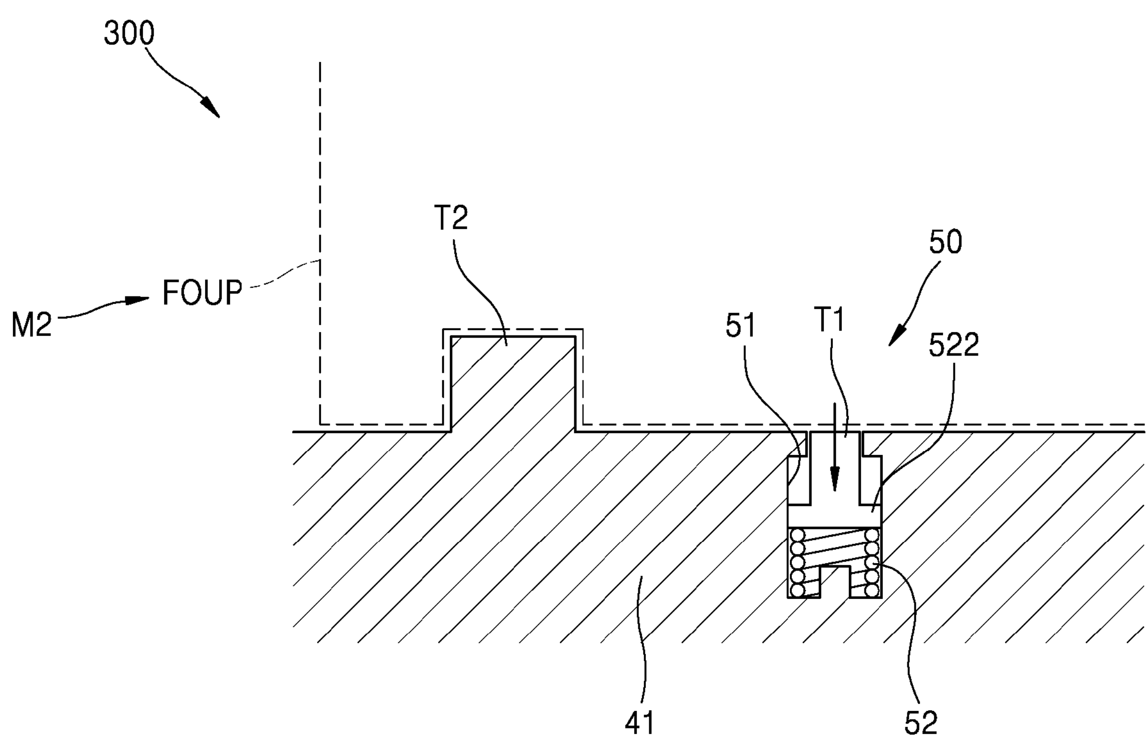
FIG. 14 is an enlarged sectional side view showing a state in which a front opening unified pod is seated on the variable alignment device of the apparatus for storing the article of FIG. 13.

FIG. 13 is an enlarged sectional side view showing a state in which a reticle pod RP is seated on a variable alignment device 50 of an apparatus 300 for storing an article according to some still other embodiments of the present invention, and FIG. 14 is an enlarged sectional side view showing a state in which a front opening unified pod FOUP is seated on the variable alignment device 50 of the apparatus 300 for storing the article of FIG. 13.

As shown in FIGS. 13 and 14, the variable alignment device 50 of the apparatus 300 for storing the article according to some still other embodiments of the present invention may be installed individually for each of the first alignment protrusions T1, and the variable alignment device 50 may include: a cylinder part 51 formed on the article storage rack S, in which the first alignment protrusion T1 including a stopper 522 is formed on one side of the cylinder part 51 so as to be lifted and lowered; and an elastic member 52 installed in the cylinder part 51, and having a restoring force formed in a direction in which the first alignment protrusion T1 protrudes.

Therefore, as shown in FIG. 13, when the first article M1 is stored, the first article M1 may be aligned in a set position while maintaining a state in which the first alignment protrusion T1 protrudes outward by the restoring force of the elastic member 52, and as shown in FIG. 14, when the second article M2 is stored, the second article M2 may be aligned in a set position by using the second alignment protrusion T2, and the first alignment protrusion T1 may be accommodated inward by the second article M2.

Figure 15:
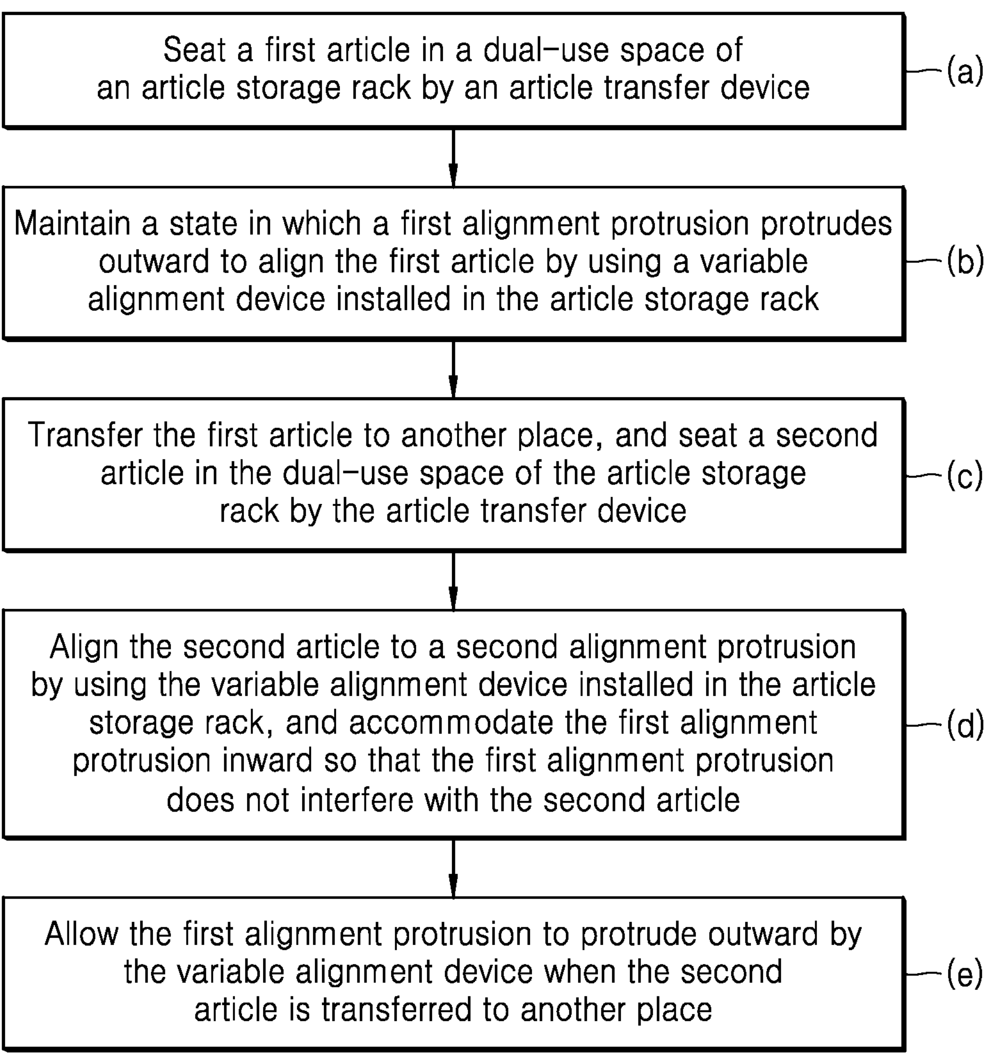
FIG. 15 is a flowchart showing a method for storing an article according to some embodiments of the present invention.

FIG. 15 is a flowchart showing a method for storing an article according to some embodiments of the present invention.

As shown in FIGS. 1 to 15, a method for storing an article according to some embodiments of the present invention may include: (a) seating a first article M1 in a space A of an article storage rack S by an article transfer device 20; (b) maintaining a state in which at least one first alignment protrusion T1 protrudes outward to align the first article M1 by using a variable alignment device 40 installed in the article storage rack S; (c) transferring the first article M1 to another place, and seating a second article M2 in the space A of the article storage rack S by the article transfer device 20; (d) aligning the second article M2 to at least one second alignment protrusion T2 by using the variable alignment device 40 installed in the article storage rack S, and accommodating the first alignment protrusion T1 inward so that the first alignment protrusion T1 does not interfere with the second article M2; and (e) allowing the at least one first alignment protrusion T1 to protrude outward by the variable alignment device 40 when the second article M2 is transferred to another place.

In this case, in the step (b), at least one elastic spring 43 having a restoring force that is greater than a weight of the first article M1 may be used to maintain the state in which the first alignment protrusion T1 protrudes outward, and, in the step (d), the elastic spring 43 having a restoring force that is less than a weight of the second article M2 may be used to accommodate the first alignment protrusion T1 inward so that the first alignment protrusion T1 may not interfere with the second article M2.

The technical idea of the present invention is not limited to the first article M1 and the second article M2, and may be applied to all of at least three articles having mutually different weights or sizes and including alignment protrusions having mutually different specifications.

Although the present invention has been described with reference to the embodiments shown in the drawings, the embodiments are provided merely for illustrative purposes, and it will be understood by a person having ordinary skill in the art that various modifications and other equivalent embodiments can be made from the embodiments. Therefore, the genuine technical scope of the present invention shall be determined by the technical idea of the appended claims.

What is claimed is:

1. An apparatus for storing an article, the apparatus comprising:

an article storage rack including a space for storing a first article or a second article; and a variable alignment device installed on the article storage rack, wherein the variable alignment device includes at least one first alignment protrusion protrudes outward at a first height to align the first article when the first article is seated, wherein the at least one first alignment protrusion is accommodated inward to a second height lower than the first height so that the at least one first alignment protrusion does not interfere with the second article when the second article is seated, wherein the variable alignment device further includes:

a base plate formed on a top surface thereof with at least one second alignment protrusion to align the second article, and including a reception part;

a movable plate installed in the reception part so as to be freely lifted and lowered, and formed thereon with the at least one first alignment protrusion; and at least one elastic spring having a restoring force acting in a direction in which the movable plate is lifted, and wherein the movable plate includes:

a movable plate body substantially having a flat plate shape;

three first alignment protrusions formed on a top surface of the movable plate body, and triangularly arranged to correspond to three alignment grooves formed in a bottom surface of the first article; and a stopper formed on one side surface of the movable plate body, and protruding in a lateral direction to prevent the movable plate body from being separated from the reception part.

2. The apparatus of claim 1, wherein the variable alignment device further include:

three second alignment protrusions that are triangularly arranged to correspond to three alignment grooves formed in a bottom surface of the second article and that are formed on the top surface of the base plate at a periphery of the reception part.

3. The apparatus of claim 1, wherein the movable plate further includes:

a guide formed on the top surface of the movable plate body, and having a top surface higher than a top surface of the at least one first alignment protrusion to protect the at least one first alignment protrusion.

4. The apparatus of claim 3, wherein the guide is each of four protruding bent pieces installed on front, rear, left, and right sides of the movable plate body, respectively, protruding laterally from the movable plate body, and bent upward.

5. The apparatus of claim 4, wherein the stopper is provided in plural, wherein the guide is provided in plural, wherein the at least one first alignment protrusion is installed adjacent to at least one of the stoppers so as to be dynamically balanced, and wherein the second alignment protrusion is disposed between at least one of the stoppers and at least one of the guides.

6. The apparatus of claim 3, wherein the base plate includes at least one guide corresponding part that is formed in the reception part to correspond to the guide.

7. The apparatus of claim 1, wherein the at least one elastic spring is configured such that a sum of restoring forces is greater than a first weight of the first article and less than a second weight of the second article.

8. The apparatus of claim 1, wherein the variable alignment device further includes: a fixing plate installed to the base plate while being spaced apart from the base plate by a clearance distance so as to support the at least one elastic spring and allow the movable plate to be lifted and lowered in a separation space.

9. The apparatus of claim 1, wherein the first article includes a reticle pod for storing a reticle, and the second article includes a front opening unified pod (FOUP) for storing a plurality of wafers.

10. The apparatus of claim 1, wherein the second article has a second weight that is greater than a first weight of the first article.

11. The apparatus of claim 1, wherein the article storage rack includes an under track buffer (UTB) or a side track buffer (STB).

12. The apparatus of claim 1, wherein the article storage rack includes: a frame installed on at least one of a ceiling, a wall, and a floor of a semiconductor manufacturing factory in which the apparatus is installed; and at least one shelf support installed on the frame to support the first article or the second article.

13. The apparatus of claim 1, wherein the variable alignment device includes: a cylinder part formed on the article storage rack, in which the first alignment protrusion including a stopper is formed on one side of the cylinder part so as to be lifted and lowered; and an elastic member installed in the cylinder part, and having a restoring force formed in a direction in which the first alignment protrusion protrudes.

14. The apparatus of claim 1, further comprising: an operation detection device for detecting an operation state of the variable alignment device, and applying a detection signal to a control unit.

15. An apparatus for storing an article, the apparatus comprising:

an article storage rack including a space for storing a first article or a second article; and a variable alignment device installed on the article storage rack, in which at least one first alignment protrusion protrudes outward at a first height to align the first article when the first article is seated, and the first alignment protrusion is accommodated inward to a second height lower than the first height so that the first alignment protrusion does not interfere with the second article when the second article is seated, wherein the variable alignment device includes:

a base plate formed on a top surface thereof with at least one second alignment protrusion to align the second article, and including a reception part;

a movable plate installed in the reception part so as to be freely lifted and lowered, and formed thereon with the at least one first alignment protrusion;

at least one elastic spring having a restoring force acting in a direction in which the movable plate is lifted; and a fixing plate installed to the base plate while being spaced apart from the base plate by a clearance distance so as to support the at least one elastic spring and allow the movable plate to be lifted and lowered in a separation space, and wherein the movable plate includes:

a movable plate body substantially having a flat plate shape;

three first alignment protrusions formed on a top surface of the movable plate body, and triangularly arranged to correspond to three alignment grooves formed in a bottom surface of the first article;

a stopper formed on one side surface of the movable plate body, and protruding in a lateral direction to prevent the movable plate body from being separated from the reception part; and a guide formed on the top surface of the movable plate body, and having a top surface higher than a top surface of the first alignment protrusion to protect the first alignment protrusion.

* * * * *